(12) United States Patent
Seo et al.

(10) Patent No.: US 6,173,222 B1
(45) Date of Patent: Jan. 9, 2001

(54) STEERING CONTROL SYSTEM AND METHOD FOR AUTONOMOUS INTELLIGENT VEHICLES

(75) Inventors: Jae-hyung Seo; Gi-seok Kim, both of Kyungki-do (KR)

(73) Assignee: Hyundai Motor Company, Seoul (KR)

( * ) Notice: Under 35 U.S.C. 154(b), the term of this patent shall be extended for 0 days.

(21) Appl. No.: 09/169,253

(22) Filed: Oct. 9, 1998

(30) Foreign Application Priority Data

Oct. 10, 1997 (KR) .................................................. 97-51963

(51) Int. Cl.[7] .............................. G06F 7/00; G06F 17/00; G06F 19/00
(52) U.S. Cl. ................................ 701/41; 701/28; 701/42; 180/421; 180/446
(58) Field of Search .................................. 701/41, 42, 43, 701/82, 83, 28; 180/402, 421, 197, 412, 446

(56) References Cited

U.S. PATENT DOCUMENTS

| | | |
|---|---|---|
| 5,559,695 * | 9/1996 | Daily . |
| 5,568,406 * | 10/1996 | Gerber . |
| 5,762,157 * | 6/1998 | Uehara .................................. 180/197 |
| 5,908,457 * | 6/1999 | Higashira et al. ..................... 701/41 |

* cited by examiner

Primary Examiner—William A. Cuchlinski, Jr.
Assistant Examiner—Gertrude Arthur
(74) Attorney, Agent, or Firm—Christie, Parker & Hale, LLP

(57) ABSTRACT

Disclosed is a steering control system and method for autonomous intelligent vehicles. The system includes image input means for supplying images of in front of the vehicle; a plurality of image grabbers which receive images from the image input means and capture image signals corresponding to the road; a first controller determining if the vehicle is being driven within the lane using near image signals received from the image grabbers; a second controller determining a driving direction of the vehicle and detecting curves in the road using distant image signals received from the image grabbers; a steering controller analyzing the information received from the first and second controllers to determine a steering angle and direction, and which outputs control signals corresponding to the analysis; and drive means for driving a steering system of the vehicle in a direction and angle corresponding to the control signals received from the steering controller.

11 Claims, 4 Drawing Sheets

STEERING CONTROL SYSTEM AND METHOD FOR AUTONOMOUS INTELLIGENT VEHICLES

BACKGROUND OF THE INVENTION (a) Field of the Invention

The present invention relates to an autonomous intelligent vehicle. More particularly, the present invention relates to a steering control system and method for an autonomous intelligent vehicle in which information of near and distant road conditions is received through cameras and used to control the steering of a vehicle.

(b) Description of the Related Art

There has been continued, rapid development in automotive technology since the inception of the automobile industry. In recent times, advances have been concentrated more in the area of electronics than in mechanics. For example, there have been many electronics-related developments that improve engine performance and efficiency, in addition to more recent advances that provide intelligent safety capabilities (e.g., air bags that are activated for operation only if the passenger is over a predetermined weight) and technology that will enable the application of vehicles that can drive without the aid of a driver.

With regard to such autonomous intelligent vehicles, various institutions and organizations are vigorously pursuing research to perfect this technology. An example is the NAVLAB vehicle developed in the United States which is capable of driving by itself on a road that is clear of obstacles. The GRAFE vehicle developed in Germany has capabilities that its developers claim enable the vehicle to travel driver-free on the Autobahn. These and other conventional autonomous intelligent vehicles utilize a camera that supplies road images which are processed and analyzed. From the analysis, automatic controls are performed to maintain the vehicle in a certain lane or side of the road by steering the vehicle, and to maintain the vehicle at a suitable speed.

However, since only a single camera is used in these conventional vehicles to detect road conditions, either smooth cornering or precise lane maintenance is compromised. That is, if the single camera is positioned at an optimal location on the vehicle to maintain the vehicle precisely in the car lane, approaching curves in the road can not be detected such that steering control through the curve is not smooth. On the other hand, if the camera is positioned to detect approaching turns in the road, minute adjustments to maintain the vehicle precisely in the center of the car lane can not be made.

SUMMARY OF THE INVENTION

The present invention has been made in an effort to solve the above problems.

It is an object of the present invention to provide a steering control system and method for autonomous intelligent vehicles in which two or more cameras are utilized and detected image signals are processed in parallel such that control for both approaching curves and to maintain the vehicle precisely between the road lane markers can be performed.

To achieve the above object, the present invention provides a steering control system and method for autonomous intelligent vehicles. The system includes image input means for supplying images of in front of the vehicle, and a plurality of elements of which are mounted at predetermined locations on the vehicle; a plurality of image grabbers which receive images from the image input means and capture image signals corresponding to the road; a first controller determining if the vehicle is being driven within the lane using near image signals received from the image grabbers; a second controller determining a driving direction of the vehicle and detecting curves in the road using distant image signals received from the image grabbers; a steering controller analyzing the information received from the first and second controllers to determine a steering angle and direction, and which outputs control signals corresponding to the analysis; and drive means for driving a steering system of the vehicle in a direction and angle corresponding to the control signals received from the steering controller.

According to a feature of the present invention, the image input means comprises first and second cameras mounted on opposite sides of the front of a vehicle; and a third camera mounted to an upper, center portion of the windshield of a vehicle.

According to another feature of the present invention, the plurality of image grabbers comprises a first, second and third image grabber corresponding respectively to the first, second and third cameras, the image grabbers processing image data received from the cameras.

The method of the present invention includes the steps of supplying near and distant images of in front of a vehicle after the images are processed to a predetermined state; capturing image signals corresponding to the road from the near and distant images, and determining a driving direction of the vehicle and detecting curves in the road from the distant images, and determining if the vehicle is being driven off-center from road lane markers using the near images; determining a steering angle and direction by analyzing the information on the driving direction, curves in the road and whether the vehicle is being driven off-center from the road lane markers; and driving a steering system of the vehicle according to the determined steering angle and direction to control steering of the vehicle.

According to a feature of the present invention, curves in the road are detected from the distant images using Equation 1 below:

$$a_n\theta_n + a_{(n+1)}\theta_{(n+1)} + a_{(n+2)}\theta_{(n+2)} + \ldots = \theta_{total} \qquad \text{Equation 1}$$

According to another feature of the present invention, the steering angle is determined using Equation 2 below:

$$\text{Steering Control} = \beta \times \text{off-center rate} + \gamma \times \text{driving direction} + \delta \times \text{vehicle speed}, \qquad \text{Equation 2}$$

where $\beta$, $\gamma$ and $\delta$ are measured ratio constants, and $\beta > \gamma > \delta$.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
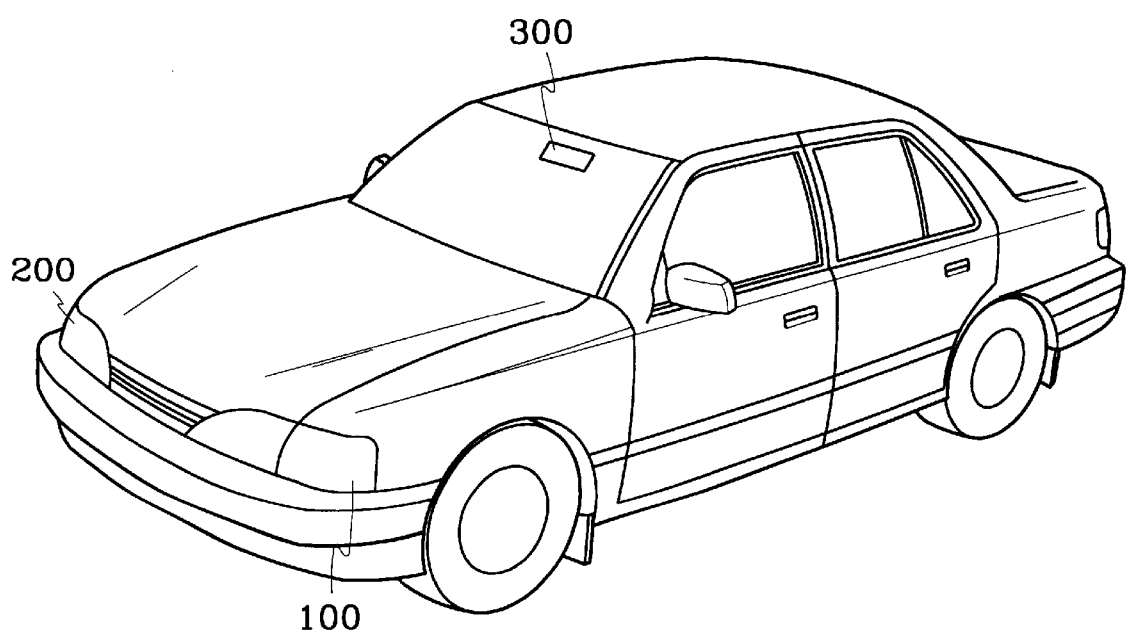
FIG. 1 is a perspective view of an autonomous intelligent vehicle used to describe positioning of cameras utilized in a preferred embodiment of the present invention.
Figure 2:
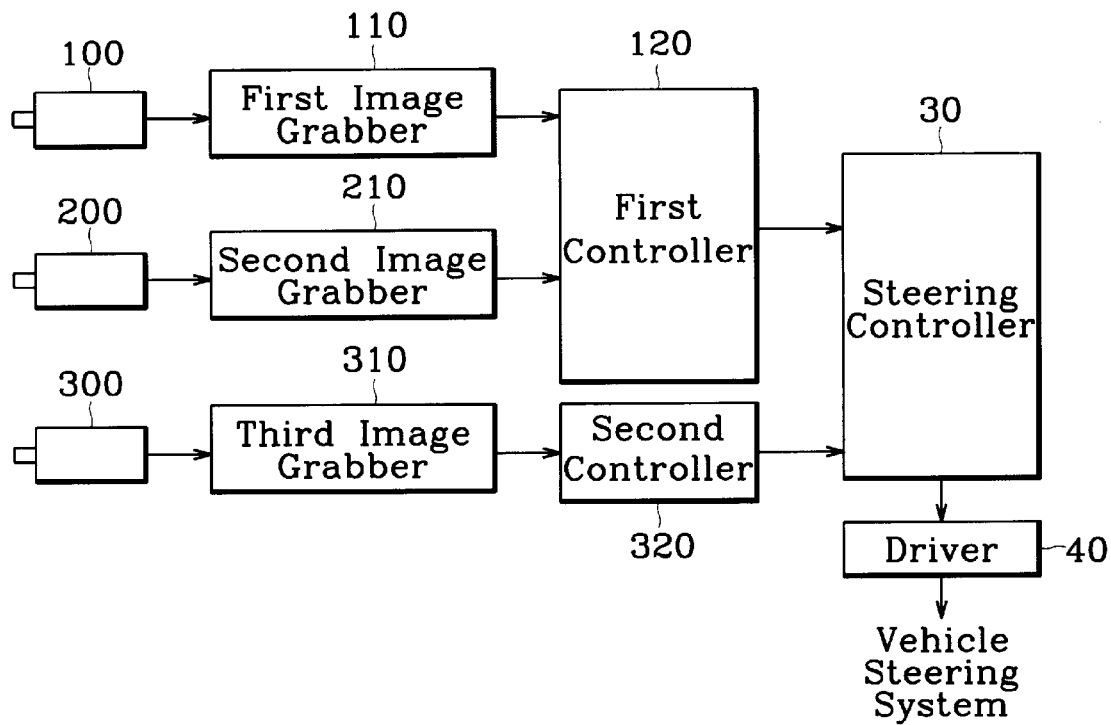
FIG. 2 is a block diagram of a steering control system for an autonomous intelligent vehicle according to a preferred embodiment of the present invention.

Referring first to FIG. 2, shown is a block diagram of a steering control system for an autonomous intelligent vehicle according to a preferred embodiment of the present invention. As shown in the drawing, the inventive steering control system comprises first, second and third cameras 100, 200 and 300 provided at predetermined positions on the vehicle, as shown in FIG. 1, and which supply images of the road in front of the vehicle, the first and second cameras 100 and 200 providing images that are near the vehicle, and the third camera 300 providing images that are more distant; first, second and third image grabbers 110, 210 and 310 for processing the images input from the first second and third cameras 100, 200 and 300, respectively, by capturing only image signals corresponding to the road; a first controller 120 receiving the image signals input from the first and second image grabbers 110 and 210, and after extracting the image signals corresponding to lane conditions, determines if the vehicle is being driven within the lane; a second controller 320 for receiving the image signals input from the third image grabber 310, and after extracting the image signals corresponding to the road, determines the present driving state of the vehicle and detects approaching curves; a steering controller 30 which receives data related to road conditions from the first and second controllers 120 and 320 to determine a steering angle of the vehicle, and outputs control signals of the steering angle; and a driver 40 which drives a steering system of the vehicle in a direction and angle corresponding to the control signals received from the steering controller 30.

Figure 3:
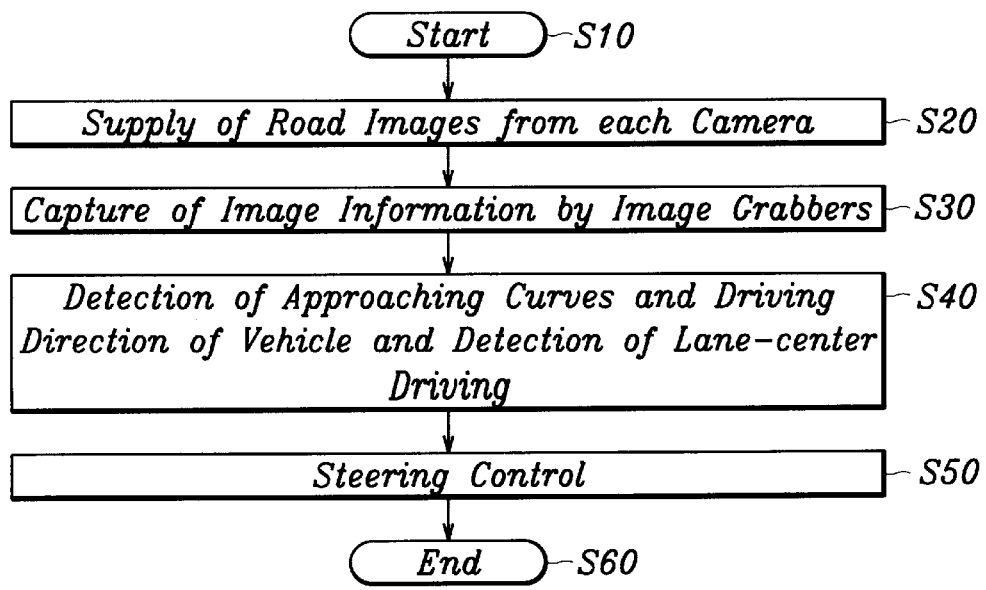
FIG. 3 is a flow chart of a steering control method for an autonomous intelligent vehicle according to a preferred embodiment of the present invention.

The operation of the steering control system structured as in the above will be described hereinafter with reference to the flow chart of FIG. 3.

First, in step S20, when the autonomous intelligent vehicle begins to drive, the third camera 300 supplies distant images in front of the vehicle to the third image grabber 310. At this time, the third camera 300 first processes the images into image data information before input to the third image grabber 310.

Next, in step S30, the third image grabber 310 captures the image data information input from the third camera 300 in units of frames, then converts this information into digital signals (using a converter installed therein) and saves the same, after which the digital signals are applied to the second controller 320 in sequence.

Figure 5:
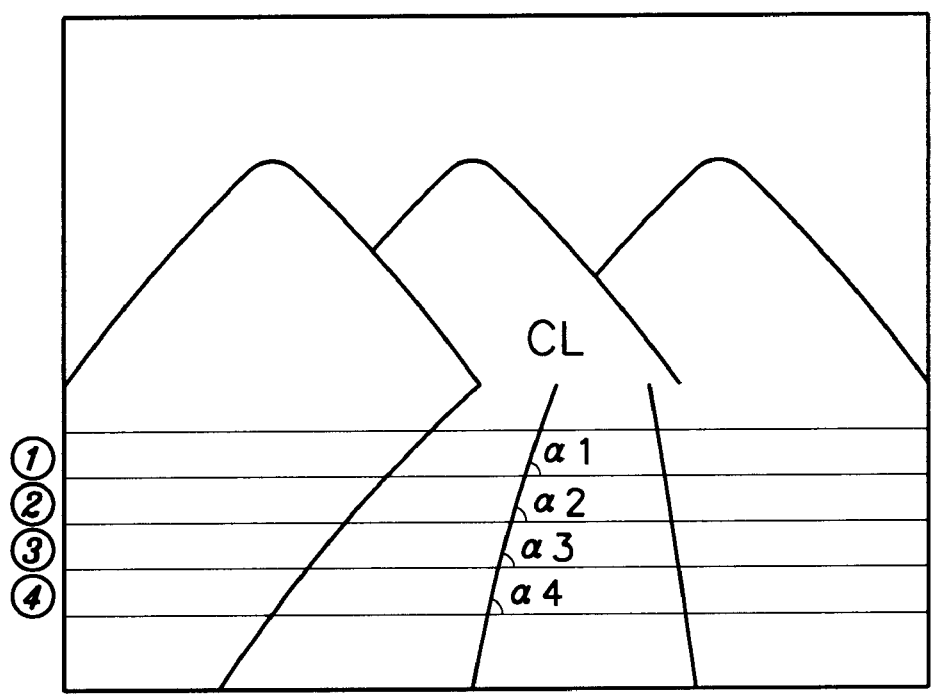
FIG. 5 is a schematic view illustrating the road as detected by a third camera according to a preferred embodiment of the present invention.

Subsequently, the second controller 320 converts the image data received as digital signals into a binary code based on a specific value, then using a Gaussian filter method in which specific brightness levels are detected, the characteristics of the road are extracted as shown in FIG. 5.

Next, in step S40, the second controller 320 divides the road into predetermined horizontal intervals (e.g., 5 meters) and determines a central value of the road by connecting all central values of the detected road lane markers. Angles between a central line CL of the road, determined by the central value, and horizontal lines 1–4, defined by the horizontal intervals, are then obtained to determine if there is an approaching curve in the road, and, if so, the sharpness of the curve. Here also, the second controller determines the present driving direction of the vehicle.

The following Equation 1 below is used to determine the existence and sharpness of approaching curves in the road:

$$\alpha 1\theta 1 + \alpha 2\theta 2 + \alpha 3\theta 3 + \alpha 4\theta 4 = \theta \text{total (curve in the road)}, \quad \text{Equation 1}$$

where $\alpha 1$, $\alpha 2$, $\alpha 3$ and $\alpha 4$ are the angles made by the intersection of the central line CL with the horizontal lines 1, 2, 3 and 4, respectively, as shown in FIG. 5; and $\theta 1$, $\theta 2$, $\theta 3$ and $\theta 4$ are ratio constants of the road for each interval. For example, in the case where the horizontal line 1 is 30 m and the horizontal line 4 is 10 m, $\theta 4=1$ and $\theta 1=0.33$.

In step S50, using the results of Equation 1, the second controller 320 outputs signals corresponding to its calculations to the steering controller 30, which, in turn, outputs control signals to the driver 40. The driver 40 then controls the steering system of the vehicle according to the control signals received from the steering controller 30.

Further, occurring simultaneously in step S20 above, the first and second cameras 100 and 200 supply images respectively of the left and right lane markers of the road, and surrounding areas, to the first and second image grabbers 110 and 210, respectively. At this time, the first and second cameras 100 and 200 first process the images into image data information before input respectively to the first and second image grabbers 110 and 210.

Next, in step S30, the first and second image grabbers 110 and 210 capture the image data information input from the first and second cameras 100 and 200, respectively, in units of frames, then convert this information into digital signals (using a converter installed therein) and save the same, after which the digital signals are applied to the first controller 120 in sequence.

Figure 4A:
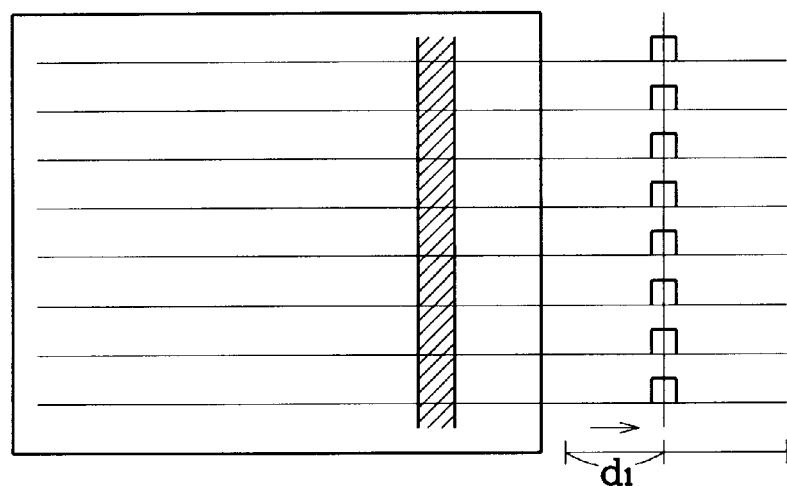
FIG. 4a is a schematic view illustrating the road as detected by a second camera according to a preferred embodiment of the present invention.
Figure 4B:
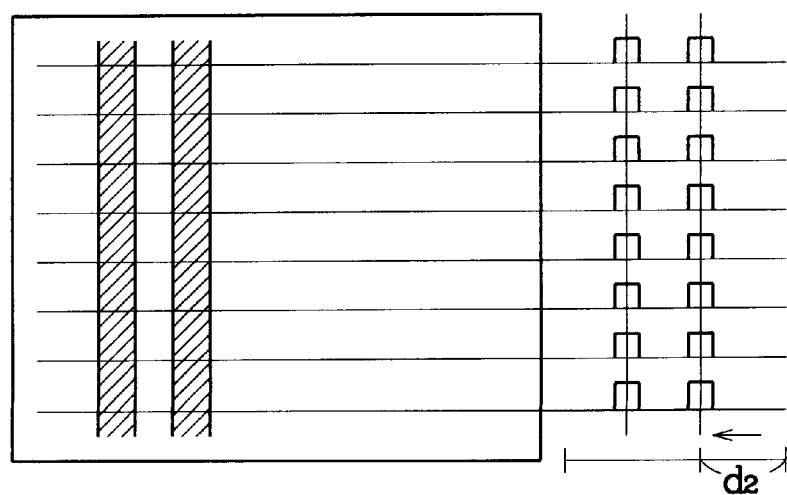
FIG. 4b is a schematic view illustrating the road as detected by a first camera according to a preferred embodiment of the present invention.

Subsequently, the first controller 120 extracts the characteristics of the road including the road lane markers, as shown in FIGS. 4a and 4b, by performing a predetermined calculation of the image signals input from the first and second image grabbers 110 and 210 using an algorithm. That is, Gauss's elimination method is used to detect the road lane markers from input the image signals.

In more detail, the right road lane marker, as shown in FIG. 4a, is detected from the image signals input from the second image grabber 210, and a distance d1 between the right side of the vehicle and the right road lane marker is determined; and a left road lane marker, as shown in FIG. 4b, is detected from the image signals input from the first image grabber 110, and a distance d2 between the left side of the vehicle and the left road lane marker is determined.

Following the above, in step S40, it is determined using the distances d1 and d2 whether the vehicle is in the center of the right and left lane markers. If it is determined in step S40 that the vehicle is off-center, the first controller 120 outputs corresponding information to the steering controller 30, which, in turn, outputs steering control signals to the driver 40. In step S50, using the input steering control signals, the driver 40 drives the steering system of the vehicle to adjust the same in the center of the road lane markers.

In step S50 above, signals received from the first controller 120 result in overall steering control, while signals received from the second controller 320 result in minute adjustments to steering as the vehicle drifts from the center of the road lane markers. In other words, the third camera 300 is used for overall steering and to steer the vehicle through corners, and the first and second cameras 100 and 200 are used to control precise adjustments in steering.

In the present invention, a final calculation is performed to control steering. Since steering using only the above method results in control that is not smooth, a final calculation is performed using the following equation:

$$\text{Steering Control} = \beta \times \text{off-center rate} + \gamma \times \text{driving direction} + \delta \times \text{vehicle speed,} \quad \text{Equation 2}$$

where $\beta$, $\gamma$ and $\delta$ are measured ratio constants, and $\beta > \gamma > \delta$.

The off-center rate is obtained by the first controller 120 in step S40 as described above, and the driving direction is obtained by the second controller 320 in step S40 as described above. The values of $\beta$, $\gamma$ and $\delta$ are those obtained through experimentation. These values, in addition to the vehicle speed, are used in Equation 2 above, and steering is controlled such that abrupt, jerking movement is prevented during the control of steering.

In the steering control system and method for autonomous vehicles described above, since a plurality of cameras are used to determine both distant and near road conditions, and to make changes and adjustments to steering based on the same, auto-driving control is smooth, accurate and safe.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A steering control system for an autonomous intelligent vehicle having a steering system, said steering control system comprising:
   image input means for supplying images appearing in front of the vehicle, said image input means comprising a plurality of elements mounted at predetermined positions on the vehicle;
   a plurality of image grabbers receiving images supplied from the image input means, and capturing image signals corresponding to a road, said captured images comprising near image signals and distant image signals;
   a first controller determining if the vehicle is being driven within a lane of the road using the near image signals captured by the image grabbers;
   a second controller determining a driving direction of the vehicle and detecting curves in the road using the distant image signals captured by the image grabbers;
   a steering controller analyzing determinations of the first and second controllers and outputting control signals comprising a steering angle and a steering direction corresponding to the analysis; and
   drive means for driving the steering system of the vehicle in the steering direction and the steering angle corresponding to the control signals outputted from the steering controller.

2. The steering control system of claim 1 wherein the image input means comprises first and second cameras mounted on opposite sides of a front of the vehicle, and a third camera mounted on an upper, center portions, of a windshield of the vehicle.

3. The steering control system of claim 2 wherein the plurality of image grabbers comprises a first, second and third image grabber corresponding respectively to the first, second and third cameras, each of the image grabbers processing the images supplied by its respective camera.

4. A steering control method for steering an autonomous intelligent vehicle with a steering system on a road, the method comprising the steps of:
   supplying near and distant images appearing in front of the vehicle after the images are processed to a predetermined state;
   capturing image signals corresponding to the road from the near and distant images, and determining a driving direction of the vehicle and detecting curves in the road from the distant images, and determining if the vehicle is being driven off-center from a road lane marker from the captured near images;
   determining a steering angle and a steering direction by analyzing the driving direction, the curves in the road and whether the vehicle is being driven off-center from the road lane marker; and
   driving the steering system of the vehicle according to the determined steering angle and the steering direction.

5. The steering control method of claim 4 wherein curves in the road are detected from the distant images using an equation below:

$$a n \theta n + a(n+1)\theta(n+1) + a(n+2)\theta(n+2) + \ldots = \theta \text{total.}$$

6. The steering control method of claim 4 wherein the steering angle is determined using an Equation below:

$$\text{Steering Angle} = \beta \times \text{off-center rate} + \gamma \times \text{driving direction} + \delta \times \text{vehicle speed,}$$

where $\beta$, $\gamma$, and $\delta$ are measured ratio constants, and $\beta > \gamma > \delta$.

7. The steering control method of claim 4 wherein the curves in the road are detected from the distant images using an Equation below:

$$\sum_{x=n}^{x=k} \alpha x \theta x$$

where $\alpha x$ is the angle made by an intersection of a central line with a horizontal line x, $\theta x$ is the ratio constant of the road for an interval between horizontal lines, and k is a finite number greater than n.

8. A steering control system for a vehicle, comprising:
   a first camera for capturing first images appearing in front of the vehicle;
   a second camera for capturing second images appearing in front of the vehicle, said second images being farther away from the vehicle than said first images;
   a first controller having a first output responsive to said first images;
   a second controller having a second output responsive to said second images;
   a steering controller for generating a steering angle and steering direction as a function of said first and second outputs; and
   an automated driver for steering the vehicle in the steering angle and the steering direction.

9. A vehicle with an autonomous steering control system comprising:
   image input means for supplying images appearing in front of the vehicle, said image input means comprising a plurality of elements mounted at predetermined positions on the vehicle;

a plurality of image grabbers for receiving images supplied from the image input means, and capturing image signals corresponding to a road, said captured images comprising near image signals and distant image signals;

a first controller for determining if the vehicle is being driven within a lane of the road using the near image signals captured by the image grabbers;

a second controller for determining a driving direction of the vehicle and detecting curves in the road using the distant image signals captured by the image grabbers;

a steering controller for analyzing the determinations of the first and second controllers and outputting control signals comprising a steering angle and a steering direction corresponding to the analysis; and drive means for driving the steering system of the vehicle in the steering direction and the steering angle corresponding to the control signals outputted from the steering controller.

10. The vehicle of claim 9 wherein the image input means comprises first and second cameras mounted on opposite sides of a front of the vehicle, and a third camera mounted on an upper, center portion, of a windshield of the vehicle.

11. The vehicle of claim 10 wherein the plurality of image grabbers comprises a first, second and third image grabber corresponding respectively to the first, second and third cameras, each of the image grabbers processing the images supplied by its respective camera.

* * * * *